Feb. 27, 1940. E. G. DUDEN 2,191,458
VALVE
Filed Oct. 16, 1937 3 Sheets-Sheet 2
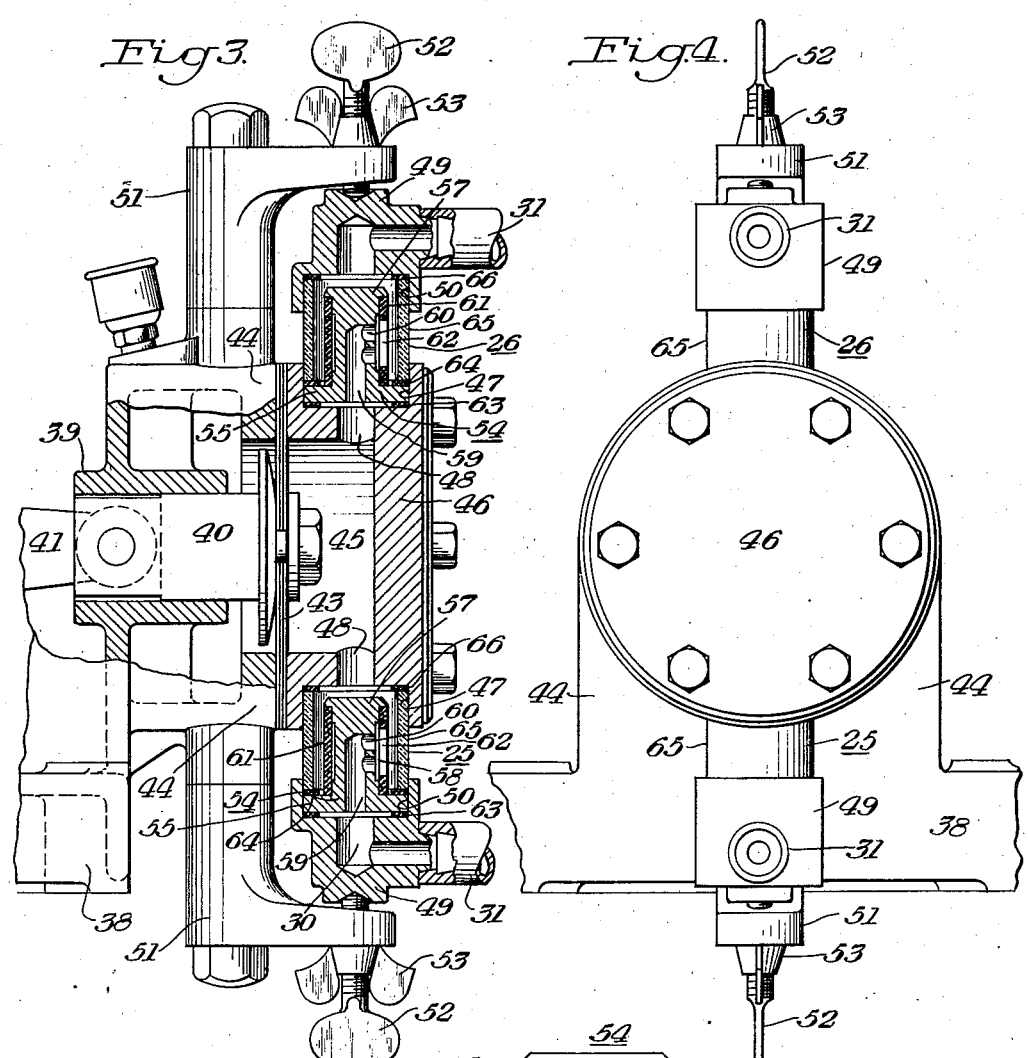
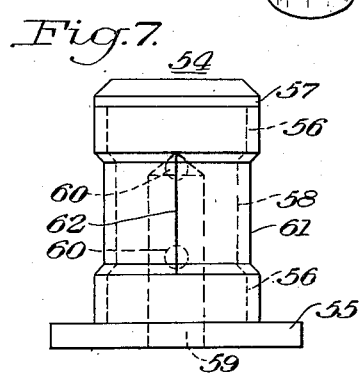
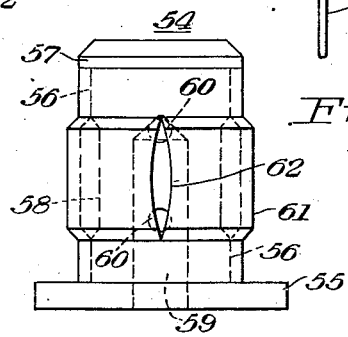
INVENTOR.
Emil G. Duden,
BY Edward C. Lawrence,
his ATTORNEY.

Feb. 27, 1940. E. G. DUDEN 2,191,458
VALVE
Filed Oct. 16, 1937 3 Sheets-Sheet 3
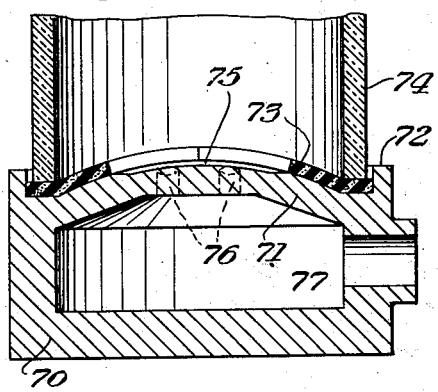
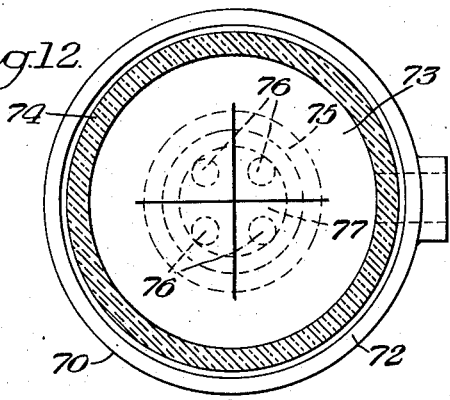
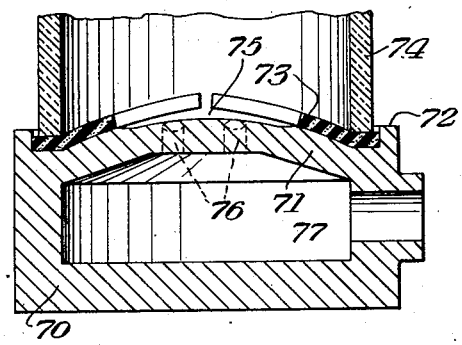
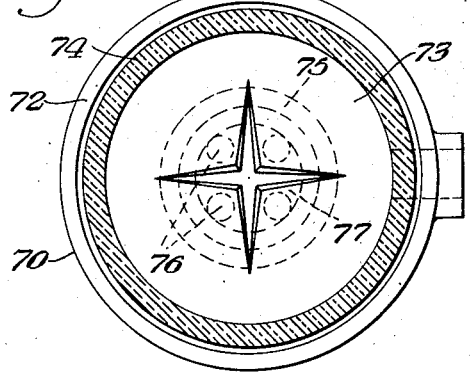
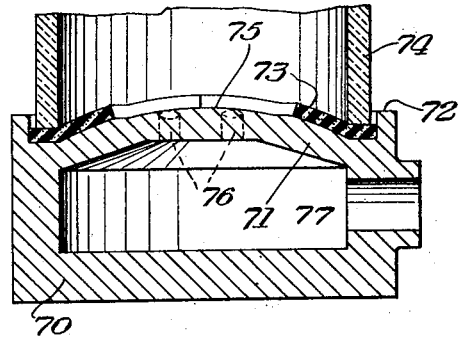
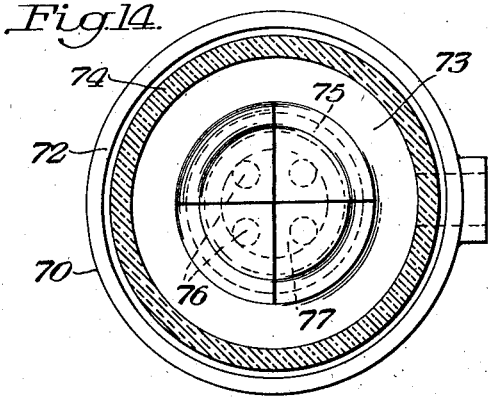
INVENTOR.
Emil G. Duden,
BY Edward A. Lawrence
his ATTORNEY.

Patented Feb. 27, 1940

2,191,458

UNITED STATES PATENT OFFICE 2,191,458

VALVE

Emil G. Duden, Oakmont, Pa., assignor to Wm. B. Scaife and Sons Company, Oakmont, Pa., a corporation of Pennsylvania Application October 16, 1937, Serial No. 169,426

5 Claims. (Cl. 251—122)

This invention relates generally to improvements in valves and more particularly to check valves made of flexible material wherein the flexing of the valve member in response to pressure operates the valve.

The principal object of this invention is the provision of a check valve that is sensitive in its operation.

An advantage gained by the sensitive valve comprising this invention resides in the accuracy of its operation when coupled with a system wherein the quantity of fluid passing through the valve is necessarily small and must be accurately measured. In work of this character the ordinary check valves, such as the flap, poppet or ball type check valves, whether biased with a spring or not, will stick causing reduced and inaccurate delivery of fluid or remain closed preventing delivery. Such valves frequently trap air or gas which may expand or contract, thereby affecting the quantity of liquid that is supposed to pass therethrough in a given time. Foreign matter, in the form of solid substances, is also effective in upsetting the accurate operation of these check valves. The check valve disclosed herein overcomes these difficulties.

Other objects and advantages appear in the following description.

The check valve comprising this invention may be advantageously employed in place of the present type of check valves in common use. However to illustrate the practical embodiment of the principles of this invention the accompanying drawings show the application of this valve as the inlet and discharge valves for a positive displacement type pump wherein:

Fig. 2 is an end elevation of the pump shown in Fig. 1.

Fig. 3 is a vertical section of a positive displacement pump of the diaphragm type showing the intake and discharge valves comprising this invention.

Fig. 4 is an elevation of the pump shown in Fig. 3.

Fig. 5 is an isometric view of the valve member.

Fig. 6 is an isometric view of the valve core upon which the valve member is arranged to be positioned.

Fig. 7 is a side elevation of the valve shown in Figs. 1 to 5 assembled on the valve core and illustrating the valve in its closed position.

Fig. 8 is a view similar to Fig. 7 illustrating the valve in its open position.

Figs. 9, 10 and 11 are detailed vertical sections, with parts of the valve shield broken away, illustrating a modified form of the valve comprising the invention under different pressure conditions.

Figs. 12, 13 and 14 are plan views of the valve shown in Figs. 9, 10 and 11 respectively with the shield removed.

Figure 1:
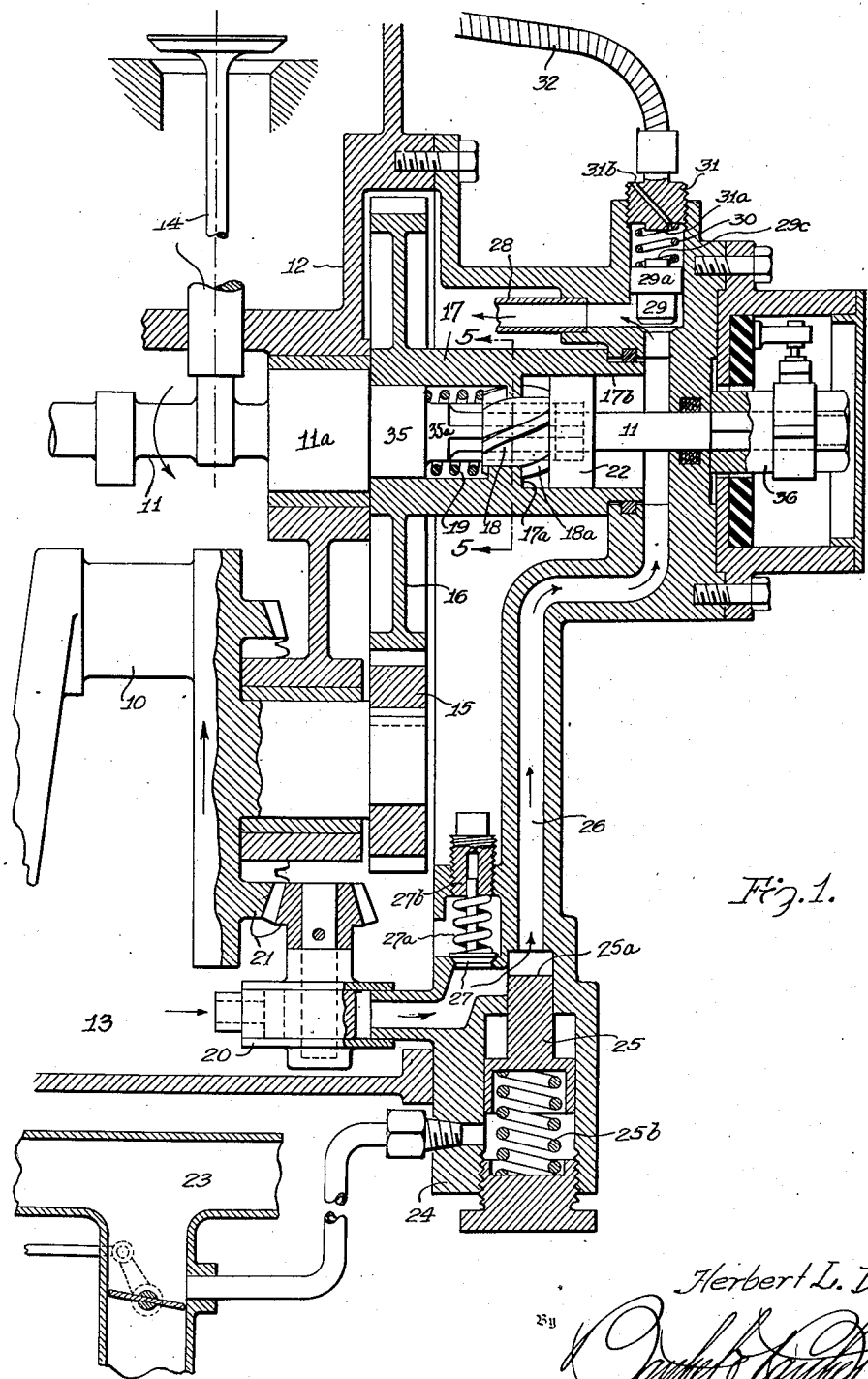
Fig. 1 is a vertical section of a positive displacement pump of the reciprocating piston type showing intake and discharge valves comprising this invention.

Referring to Figs. 1 and 2 of the drawings, 15 represents a base plate of a positive displacement pump of the reciprocating piston type. The base plate is provided with a lug 16 which is bored out as shown at 17 to receive the cylindrical body portion or liner 18 of the pump 19. One end of the pump 19 is provided with the head 20 having a bore 21 disposed transversely to and in communication with the pump cylinder bore 22 which lies axially of the body portion 18. The other end of the pump 19 (not shown) extends beyond the lug 16 and may be provided with an external thread arranged to receive a nut for drawing the head 20 against the outer face of the lug 16 and thereby secure the pump in assembled position on the base.

23 represents the pump piston which is arranged to be reciprocated, by any suitable means, within the pump cylinder bore 22.

The head 20 is provided with recesses 24 at the top and bottom thereof. These recesses are concentrically positioned with the ends of the bore 21. The seats formed by these recesses are arranged to receive the inlet and discharge valve assemblies 25 and 26 respectively. 27 and 28 represent the inlet and discharge manifolds, which like the valve assemblies are duplicate parts. Each of these manifolds is provided with a recess 29 to receive the other end of the valve assemblies. These recesses are concentrically positioned with the passageways 30 connecting the valve chambers to suitable conduits 31 for transmitting the fluid being pumped.

A pressure plate 32 is mounted on the outer end of each manifold and is provided with a centering well 33. 34 represents a yoke comprising a continuous band having a reenforcing rib and which is cast in the form of a rectangular loop. The inner surface of the bottom of the yoke is provided with an integral button 35 arranged to be inserted in the centering well 33 of the lower pressure plate 32. The top of the yoke is provided with a boss through which a hole is drilled and tapped for receiving the bolt 36 which may extend into the centering well 33 of the upper pressure plate 32. When the valve assemblies, the spacer cylinder the valve member opens up as illustrated in Figs. 10 and 13. When this valve is used as the inlet valve of a pump the valve opens up in this manner during the suction stroke.

Figs. 11 and 14 illustrate the position of the valve when a suction or low fluid pressure is in the manifold and a higher fluid pressure is in the spacing cylinder. The differential in the fluid pressure forces the flexible valve member into the chamber or recess 15, thereby tightly closing the slit to prevent the passage of fluid therethrough.

The operation of this novel valve depends upon the flexibility of the material from which the valve member is made. There are no sliding or interengaging parts causing friction or surfaces between which foreign matter may be trapped causing inaccurate operation of the valve. If a piece of foreign material was trapped in the slit of a valve member the flexible material is sufficiently resilient to close around it without causing leakage. The next time the valve slit is opened such foreign matter is carried away.

Valves comprising this invention depend solely upon the fluid pressure differential for their operation and are susceptible to the reversal of small pressures making them very accurate in their operation, which is especially desirable where very small quantities of a fluid are to be metered by check valves of this character.

I claim:

1. In a check valve, the combination of a valve body having an inlet and outlet, a valve support in said body having a passageway connecting said inlet and outlet, a flexible valve member closing said passageway and held by said support against flexing toward the inlet of said valve body, means defining a slit through the valve member arranged to be expanded directly by fluid under pressure in the inlet end of the valve to permit the flow of fluid to the outlet, and means defining a recess in the valve support adjacent the slitted portion for receiving the same to hold the slit in sealing relation when the pressure in the outlet side of the valve exceeds the pressure in the inlet side.

2. In a check valve, the combination of a valve body having an inlet and outlet connected by a passageway for fluid, a cylindrical valve core mounted in the passageway of said valve body, means defining a fluid passageway through said core forming a port in the cylindrical surface thereof, a cylindrically shaped flexible valve member arranged to snugly fit on the cylindrical surface of said core, means defining a slit through said valve member, and means defining a recess in said core adjacent said port for receiving that portion of the valve member adjacent said slit to seal the same when the pressure on the outer surface of said valve member exceeds the pressure in said recess.

3. In a check valve, the combination of a valve body having an inlet and outlet connected by a passageway for fluid, a valve supporting bridge across said passageway, means defining a fluid port through said bridge, a disc-shaped flexible valve member arranged to lie over said bridge and close said port, means defining a slit through said valve member, and means defining a recess in said bridge adjacent said port for receiving that portion of the valve member adjacent said slit to seal the same when the pressure on the outer surface of said valve member exceeds the pressure in said recess.

4. In a check valve, the combination of a valve body having an inlet and outlet, a valve support in said body having a passageway connecting said inlet and outlet, an arcuate flexible valve wall mounted in the valve body closing said passageway and held by said support against flexing toward the inlet of said valve body, means defining a slit through said wall arranged to be expanded directly by fluid under pressure in the inlet end of the valve to permit the flow of fluid to the outlet, and means defining a recess in said support adjacent the slitted portion for receiving the same to hold the sides of the slit in sealing relation when the pressure in the outlet side of the valve exceeds the pressure in the inlet side.

5. In a check valve, the combination of a valve body having an inlet and outlet, a valve support in said body having a passageway connecting said inlet and outlet, an arcuate flexible valve wall mounted in the valve body closing said passageway and held by said support against flexing toward the inlet of said valve body, means defining a slit through said wall disposed normal to the arcuate surface and arranged to be expanded directly by fluid under pressure in the inlet end of the valve to permit the flow of fluid to the outlet, and means defining a recess in said support adjacent the slitted portion for receiving the same to hold the sides of the slit in sealing relation when the pressure in the outlet side of the valve exceeds the pressure in the inlet side.

EMIL G. DUDEN.